(12) United States Patent
Greenberg et al.

(10) Patent No.: US 7,694,295 B2
(45) Date of Patent: Apr. 6, 2010

(54) DISPLAYING A VENDOR PROVIDED INFORMATION SCREEN IN RESPONSE TO A LOG-IN EXPERIENCE

(75) Inventors: Rob Greenberg, Tomball, TX (US); Ramez Badaoui-Najjar, Spring, TX (US); Curtis R. Jones, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1676 days.

(21) Appl. No.: 10/766,064

(22) Filed: Jan. 28, 2004

(65) Prior Publication Data
US 2005/0132355 A1 Jun. 16, 2005

Related U.S. Application Data

(60) Provisional application No. 60/530,700, filed on Dec. 16, 2003.

(51) Int. Cl.
*G06F 9/445* (2006.01)
*G09G 5/36* (2006.01)

(52) U.S. Cl. ...................... 717/175; 345/547

(58) Field of Classification Search ................ None
See application file for complete search history.

(56) References Cited

U.S. PATENT DOCUMENTS

| 5,577,244 A * | 11/1996 | Killebrew et al. ........... 717/169 |
| 6,098,097 A * | 8/2000 | Dean et al. ................ 709/220 |
| 6,418,555 B2 * | 7/2002 | Mohammed ............... 717/169 |
| 6,567,860 B1 * | 5/2003 | Maxwell et al. ............ 719/327 |
| 6,681,323 B1 * | 1/2004 | Fontanesi et al. .............. 713/1 |
| 6,832,379 B1 * | 12/2004 | Zeryck et al. .............. 719/327 |
| 6,934,956 B1 * | 8/2005 | Allen ........................ 719/327 |
| 2003/0020671 A1 * | 1/2003 | Santoro et al. .............. 345/1.3 |

* cited by examiner

*Primary Examiner*—Chuck O Kendall

(57) ABSTRACT

A screen driver is included with other drivers provided by a vendor with a computer system The screen driver is picked up by the OS along with the other drivers at the beginning of the installation of the OS. The screen driver remains dormant until the first time a user logs into the computer system. At that time, the driver executes and retrieves screen data along with a program that displays the screen. The program also maintains the displayed screen on top of any other screens that might be generated subsequent to completion of the first log-in to maintain visibility to the user until the user has an opportunity to act on the display screen.

29 Claims, 6 Drawing Sheets

DISPLAYING A VENDOR PROVIDED INFORMATION SCREEN IN RESPONSE TO A LOG-IN EXPERIENCE

CROSS-REFERENCE TO RELATED APPLICATIONS

This application claims the benefit of U.S. Provisional Application No. 60/530,700, filed Dec. 16, 2003.

BACKGROUND

Some computer systems, such as servers, are commonly sold to customers without any operating system (OS) installed. Typically, the user (such as an administrator for the entity that purchased the computer system) handles installation of the desired OS at the user's site. There are a few different OS products available to such a user, and the user's options will be dictated by compatibility with the computer system itself. One might be a version of the Windows® OS such as Windows® 2003, or a version of the Linux or Novell OS. (Windows is a registered trademark of Microsoft Corporation).

To communicate with various hardware components of the computer system, OS software products typically require driver programs that are compatible with those components. For example, for the OS to successfully store data on a hard drive component of the system, the OS must have a storage driver that permits the OS to access (i.e. read and write data from and to) the hard disk drive. Often, because the development of systems and the OS proceed in parallel, the software drivers for certain hardware components of a system may not be written in time to be incorporated into the OS before it is released to the public. Thus, certain driver programs may have to be provided with the system. If these drivers are required for successful installation of the OS on the system (e.g. a disk drive storage driver), then they must be provided at the time of installation of the OS. Otherwise, the installation will be interrupted and will not complete successfully because the installation of the OS itself typically involves writing the OS program to the hard drive of the system.

Drivers critical to the installation of the OS and that have not been otherwise already incorporated into the OS may be shipped by the computer system purveyor with the computer system so that they can be provided to the OS during the OS installation process. Typically, purveyors of OS software programs build in the necessary software hooks by which these drivers may be loaded onto the system at the very beginning of the OS installation process to ensure that installation continues successfully. In Windows®, for example, the software provides a prompt during the initial stages of installation that queries the user regarding the existence of any drivers that must be loaded. If the user responds in the affirmative, OS installation is paused and drivers may be loaded by way of a CD ROM or a floppy disk via the system's CD ROM drive or its floppy drive respectively.

SUMMARY

This disclosure describes methods and apparatus by which an information display screen supplied by a vendor of a computer system is displayed on the computer system that communicates useful information to the user at the time of a user's log-in experience. In an embodiment, the information screen is displayed in response to a first log-in experience on the system subsequent to the installation of the OS. The screen is displayed in response to the execution of a screen driver that is provided to the system during installation of the OS, at a time and in a manner used to provide other critical drivers required for installation of the OS.

BRIEF DESCRIPTION OF THE DRAWINGS

For a detailed description of embodiments of the invention, reference will now be made to the accompanying drawings in which.

NOTATION AND NOMENCLATURE

Figure 1:
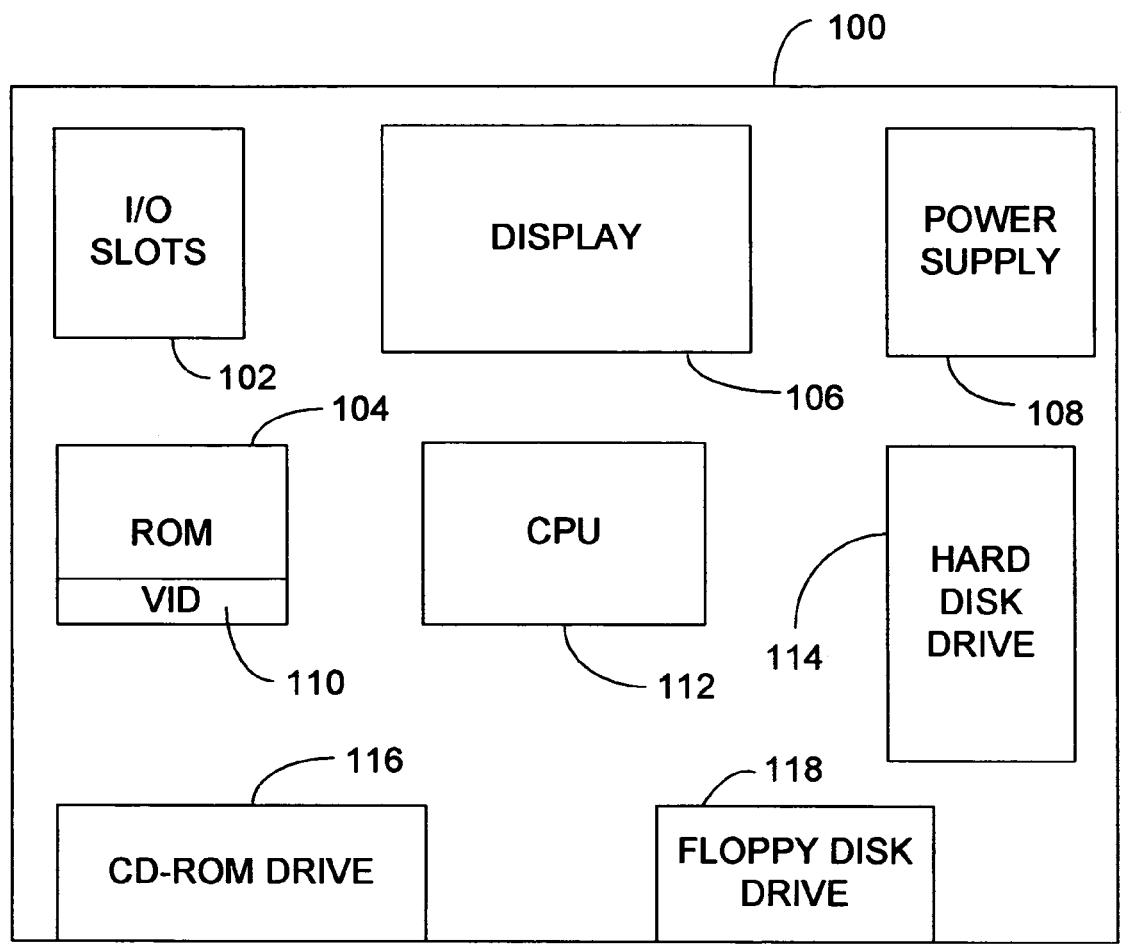
FIG. 1 is a block diagram illustrating some components that comprise a typical computer system such as a server in accordance with an embodiment of the invention.

Certain terms are used throughout the following description and in the claims to refer to particular procedures, processes and actions resulting therefrom. As one skilled in the art will appreciate, those skilled in the art may refer to a procedure, process or result by different names. This document does not intend to distinguish between components, procedures or results that differ in name but not function. In the following discussion and in the claims, the terms "including" and "comprising" are used in an open-ended fashion, and thus should be interpreted to mean "including, but not limited to . . . ."

DETAILED DESCRIPTION

The following discussion is directed to various embodiments of the invention. Although one or more of these embodiments may be preferred, the embodiments disclosed should not be interpreted as, or otherwise be used for, limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Often, the computer system vendor provides or makes available optional upgrades to its computer systems, including hardware upgrades such as expanded memory or value added software that improves performance or facilitates maintenance of the system. The ideal time for reminding the user of the availability of these upgrades (or to actually install them if already provided) is typically at the time the user logs onto the computer system for the first time. This first log-in experience most often takes place immediately following the installation of the OS. Thus, it would be advantageous to provide the user with an information display screen at the time of the user's first log-in that communicates information to the user regarding the availability and/or the installation of these upgrades, or any other information that might be usefully communicated by the system manufacturer to the user at that time. Moreover, it might also be advantageous, depending upon the information to be conveyed, to display information screens to the user during subsequent log-ins as well.

It may also be important to maintain any information display screen provided by the computer system vendor on top of (and therefore continuously visible to the user over) other screens that may be generated after the vendor supplied information display screen is generated (e.g. screens generated by the OS after the log-in experience is complete). This state of maintaining display priority on behalf of the vendor provided information display screen can be made to persist until some other predetermined event takes place, such as for example the generation of a particular display screen by the OS. The generation of a particular screen can be used when it signifies an end to any further display window generating activity by the OS, wherein the display of any such windows would otherwise obscure some or all of the vendor provided information display screen before a user has had a chance to view it and interact with it.

Upon detection of the specific display window, the priority of windowed display activity can be returned to a more normal mode of operation whereby the user can interact with the vendor provided information display screen, or deliberately select another of the currently available information display screens to be displayed over the vendor provided screen. Of course, the user will always be able to deliberately close the vendor provided information screen at any time during the process. Without this temporary allocation of display priority to the vendor provided display screen, it may be quickly obscured by other display screens that are generated subsequently to the vendor provided display screen by programs automatically launched by the OS just after the login experience has been completed. Moreover, it may be important to ensure that the processes by which the provided display screen is displayed and maintained on top of subsequently generated display screens does not interfere with the normal completion of the login experience.

Referring now to FIG. 1, a block diagram illustrates some of the components that typically comprise a computer system or server 100 in accordance with an embodiment of the invention. Of course, computer system 100 includes a power supply 108, and typically includes I/O slots 102 by which the computer system 100 communicates with external devices such as printers, memory devices, other computer systems, etc. Display 106 is provided for displaying the graphical user interface (GUI) of a typical OS as well as hypertext mark-up language (HTML) pages, application files, etc. A hard disk drive 114 is typically used to store system data, application programs, and the OS software once installed. CD-ROM drive 116 and floppy disk drive 118 provide mechanisms by which data and software (including the OS and application software) can be read into the computer system 100 for installation on the hard disk drive 108, as well as storing of data from the hard drive and the system's other accessible memory.

As previously discussed, necessary drivers not resident with the OS (such as drivers necessary to access the hard drive developed subsequent to release of the OS) may be shipped with the computer system on a CD-ROM or floppy disk. The OS prompts the user to install these drivers at the beginning of the OS installation process. Another technique, which is less burdensome to the user, is for the computer system vendor to provide the computer system with the critical drivers stored in some portion of the computer system's memory where the OS knows to look for them automatically during the installation process. One technique that has been used to accomplish this stores the driver software on the boot ROM of the computer system in an otherwise unused area of the address space of the ROM called a virtual install disk (VID). This space has been referred to as a virtual install disk (VID) because the OS is provided with hooks to recognize this otherwise unused space in the boot ROM as if it were a virtual floppy disk drive.

At some point in the early stages of the installation process, the OS knows to read the VID to determine whether it contains any drivers that it might need. Any drivers stored therein are retrieved from the VID and used as needed during the installation process. Thus the user does not have to intervene to ensure that the drivers are installed. The use of this virtual disk drive technique is disclosed in a patent application U.S. Ser. No. 09/965,998 entitled "Method of Using Reserved ROM Space for Storage of Operating System Drivers," which is incorporated herein in its entirety by this reference.

With reference to FIG. 1, boot ROM 104 typically contains the program code first executed by the computer system 100 on power-up. The boot program sets up the computer and readies it to seek the OS software for installation, or the execution of the OS if already installed. As discussed above, memory space in the boot ROM 110 unallocated to the boot program can be allocated to store other data and software such as drivers that may be required during installation of the OS software. As previously mentioned, in one embodiment the OS is provided with software hooks to make this memory space in the boot ROM appear as a virtual installation disk (VID) 110. In this manner, the OS can be set up to always seek needed program information such as storage drivers from this memory space during the initial stages of OS installation, much as it seeks the OS software from the CD-ROM drive 116 or the floppy disk drive 118 prior to installation of the OS. Finally, the computer system 100 typically includes at least one CPU 112 which coordinates all these activities, at first under control of the program in the boot ROM 104 and then ultimately the installed OS software.

Those of skill in the art will recognize that the representation of a typical computer system in FIG. 1 is illustrated at a high level of abstraction, and is intended only to be illustrative of some of the components that are typically found in a computer system and that are relevant to embodiments of the present invention disclosed herein. Those of skill in the art will be familiar with the manner in which these components are typically interconnected and thus such detail is omitted for purposes of simplicity.

Figure 2A:
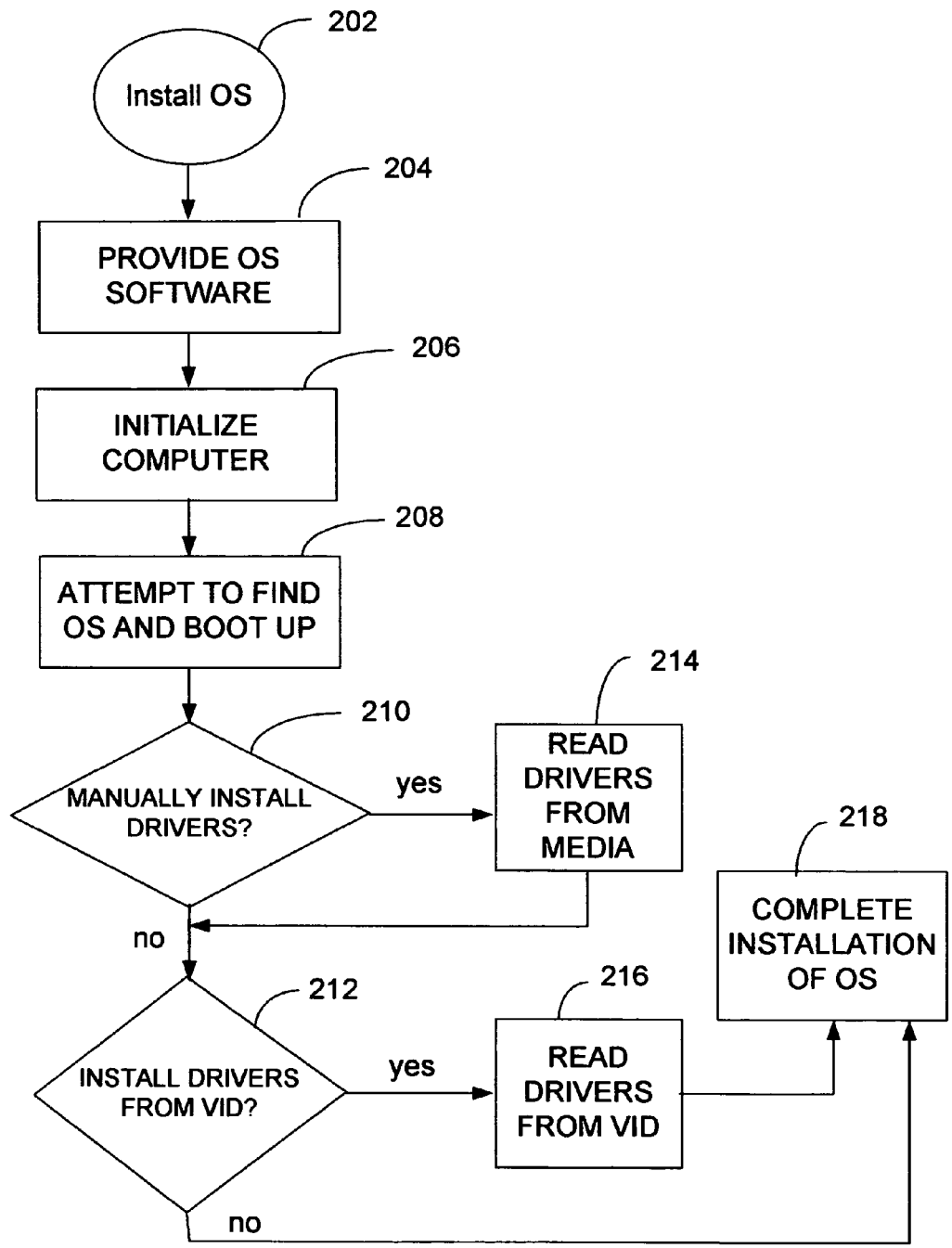
FIG. 2A is a procedural flow diagram illustrating installation of operating system (OS) software in accordance with an embodiment of the invention.

FIG. 2A illustrates a procedural flow, Install OS 202, by which an embodiment of the invention installs an OS. First, a source of OS software is provided at procedure 204, typically by way of a CD-ROM or a floppy disk, which is inserted by the user into the appropriate drive (116, 118 of FIG. 1 respectively). The computer system 100 is powered up and then typically begins executing the program in boot ROM 104, FIG. 1 to initialize the computer system at 206, including the execution of functions such as partitioning the hard drive 114, FIG. 1.

At 208, the computer system 100, FIG. 1 seeks a source for the OS installation, typically from CD-ROM drive 116, FIG. 1 and then at floppy disk drive 118, FIG. 1 if no CD-ROM is found in drive 116, FIG. 1. Once a source for the OS is identified, the computer system begins to install the OS software from the identified source and processing continues at 210.

At 210 the computer system 100, FIG. 1 prompts the user to determine whether any drivers not already resident in the OS software are to be provided manually to support the installation process. As previously discussed, these drivers would likely be storage drivers or drivers for some other component of the computer system directly involved in the OS installation. This query is typically displayed by the OS for the benefit of the user on display 106, FIG. 1 and requires a specific response from the user via the computer system's keyboard (not shown) to initiate manual installation of such drivers. The drivers can be manually provided, for example, as stored on a floppy disk by way of the floppy disk drive 118, FIG. 1. If the user responds affirmatively, processing continues at 214 and the drivers are read from the provided external media, such as a floppy disk. Processing then continues at 212. If the user does not respond within some predetermined time, processing also continues at 212.

At 212, the installing OS determines whether there are any drivers necessary for the installation process stored in the VID 110, FIG. 1. If yes, processing continues at 216, where the drivers are read from the VID 110, FIG. 1. Those of skill in the art will recognize that it is not necessary that such drivers be stored and provided via a VID 110, FIG. 1. For example, the drivers may be stored on another part of the ROM 104 that is not necessarily configured to be recognized as a virtual floppy disk drive by the operating system. Moreover, they may be stored in any known type of memory that might be supplied with the computer system 100, FIG. 1. The only requirement is that the OS have the requisite hooks to recognize the memory component and to know the location of the drivers within the component. It can be convenient to use the VID 110, FIG. 1 as the location in which to store the drivers for an OS that is already configured to recognize the VID 110, FIG. 1 as a virtual floppy disk drive, such as Microsoft Windows® 2003.

Once all of the drivers are pulled in by the OS installation process, whether manually at 210, 214 and/or automatically at 212, 216, the OS installation proceeds to completion at 218 with the installed OS being stored on the hard drive 114 of computer system 100.

In an embodiment of the invention, a special screen driver can be provided, either by way of VID 110, FIG. 1 (or some other storage component within the computer system 100, FIG. 1 as discussed above), or by way of the external storage media used in providing the drivers manually at procedures 210 and 211. The screen driver is not necessary to installation of the OS (i.e. it is not a storage driver or the like) but is simply picked up by the OS during installation from the same source that the OS recognizes as the source for critical drivers during OS installation. Once retrieved, the screen driver is then stored somewhere in the system memory for later execution during the very first log-in experience of a user of the computer system subsequent to OS installation. Thus, the screen driver may be included with other drivers that are provided with the computer system, and because the OS is already retrieving other drivers in the manner previously described, this special screen driver is pulled in by the OS along with the other drivers. In an embodiment of the invention, execution of this special screen driver can cause the system to further retrieve the necessary programs and data required to display one or more information screens to the user on display 106 during the first log-in experience. A manner in which this screen driver operates in accordance with an embodiment of the invention is now described with reference to FIGS. 2B-2D.

Figure 2B:
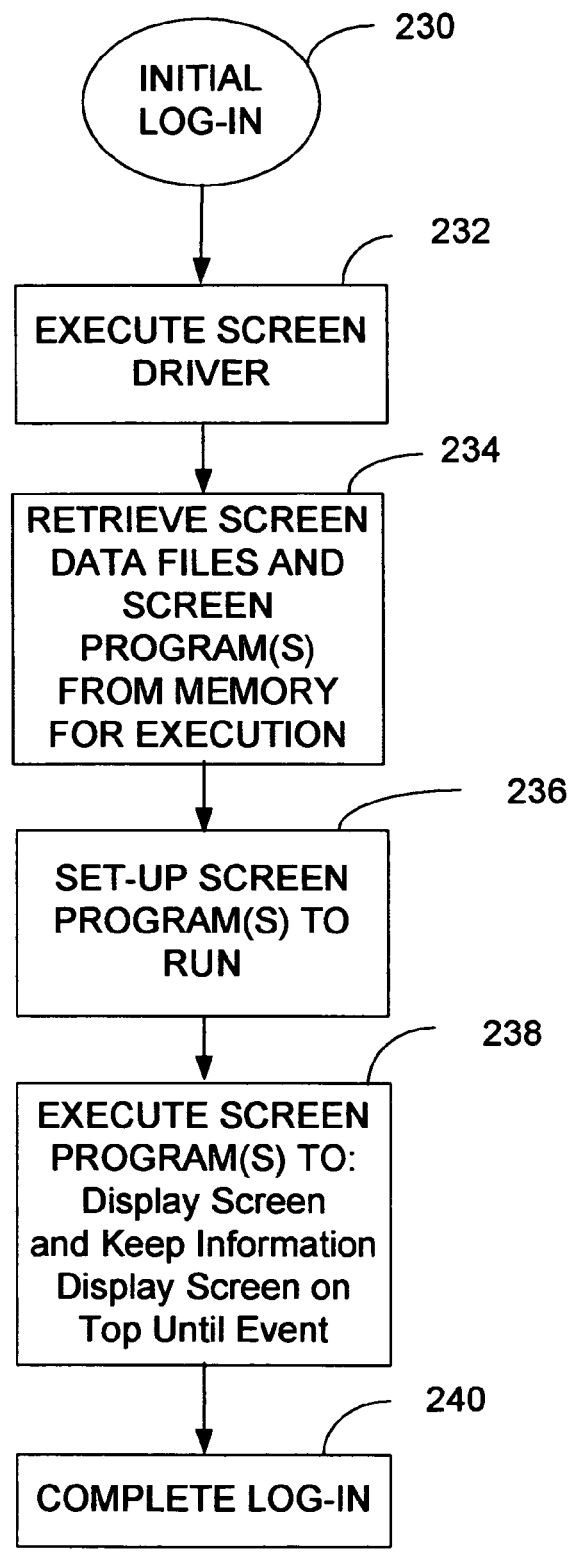
FIG. 2B is a procedural flow diagram illustrating an initial log-in experience on a computer system in accordance with an embodiment of the invention.

FIG. 2B illustrates a procedural flow for the first log-in experience 230 with the computer system 100, FIG. 1 in accordance with an embodiment of the invention. Once the first log-in is initiated, the screen driver wakes up and immediately begins executing at 232. The execution of the screen driver at 234 causes the system to retrieve screen data files defining each of the one or more information screens that are to be displayed, as well as a screen program. Those of skill in the art will recognize that more than one process can be accomplished by either a single program for each process or one program including all processes. Thus, such a distinction is not important to the invention and it should be recognized that reference hereinafter to a single retrieved program that contemplates one or more processes is equivalent to a series of programs each corresponding to one or more processes.

One purpose of the retrieved screen program is to use the screen data files to display the one or more information screens. Another purpose of the retrieved screen program is to maintain display priority in the vendor provided information screen so that it is displayed on top of certain other screens that may be generated subsequent to the completion of the log-in process and which would otherwise obscure the display of the vendor provided information screen generated by an embodiment of the invention. Windows® and other operating system paradigms that generate overlapping screens tend to pass focus to the most recently generated screen which is displayed over earlier generated screens. Thus, it may be desirable for an embodiment of the invention to alter that default mode of display priority to ensure that the vendor provided display screen remains on top of subsequently generated screens until occurrence of some predetermined event. Otherwise, the user may not notice the generated information screen at the time log-in is completed, and may never notice it before it is inadvertently closed.

In an embodiment of the invention, it may also be desirable that execution of the retrieved screen program neither pauses nor otherwise interferes with the log-in process. Because the processes of displaying the vendor provided information screen and maintaining the screen on top of other subsequently generated screens are necessarily launched during some phase of the log-in process and remain extant beyond completion of the log-in process, it is important that the execution of these active processes not suspend or interfere with the completion of the log-in process Thus, the retrieved program can be set up at 236 to run last in a given phase of the log-in process to avoid interfering with any other log-in processes native to the OS in that phase, and to ensure that phase completes so that any other phases, if any, can also be executed. Moreover, the retrieved program (as well as the screen driver itself) can also be set up at 236 to run only once, during the first log-in experience after installation of the OS. This may be desirable if the vendor provided information screen is no longer relevant on subsequent log-ins. Of course if the OS should ever be reinstalled, the driver can be retrieved by the OS once again, and can again execute upon the first log-in experience after any such reinstallation. Notwithstanding the foregoing, those of skill in the art will recognize that under different circumstances, it may be advantageous to display the vendor provided information screen in conjunction with more than just the initial log-in experience, such as where one or more of the information screen(s) is (are) relevant during subsequent log-in experiences.

The procedural flow continues at 238 with execution of a process that generates a vendor provided information screen for display. The retrieved screen program may include a process the execution of which instantiates a browser that is able to display a screen based on hypertext mark-up language. The retrieved screen data file or files can be HTML based and thus displayed using the browser program. Those of skill in the art will recognize that other means for generating the display screen may be used, but that HTML makes convenient use of commercially available browser programs.

Execution of the retrieved program at 238 may also include a process that alters attributes of the browser to ensure that the displayed vendor supplied information screen remains on top of all other subsequently generated screens until some predetermined condition or event is detected. In an embodiment of the invention, the condition/event can be that some particular screen has been generated by the OS after which no other screens will be generated that could obscure the vendor provided information screen, at least before a user has an opportunity to read or interact with it. From the point at which the condition or event is detected, the retrieved program will alter the attributes of the browser back to the default display priority mode, wherein other screens are permitted to be displayed over the vendor provided information screen. Once the processes of the retrieved screen program have been launched, the log-in experience is permitted to complete at 240.

Figure 2C:
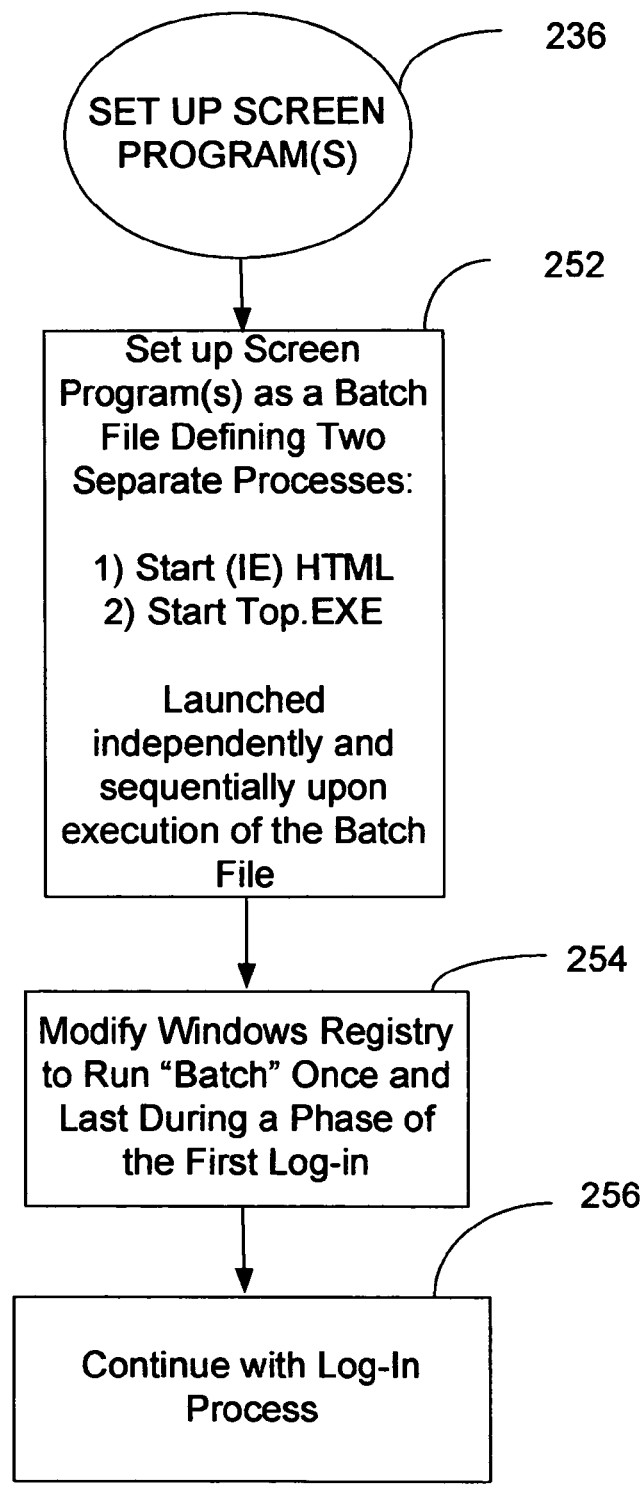
FIG. 2C is a procedural flow diagram illustrating setting up a batch file during the initial log-in experience of FIG. 2B in accordance with an embodiment of the invention.

In an embodiment of the invention as applied to Windows® 2003, an embodiment of the process of setting up the retrieved screen program to run once and last during a given phase of the log-in experience 236 is illustrated in FIG. 2C. First, the retrieved screen program is set up as a batch file at 252 that includes at least two processes. The first process, 'Start (IE) HTML' instantiates the browser that displays the vendor provided information screen in accordance with the retrieved screen data files. This process remains extant until the instantiation of the browser created by the first process is closed. The second process, hereinafter referred to as 'Top.exe,' is launched to alter attributes of the browser to maintain the vendor displayed information screen on top of any other subsequently generated screens, including screens that may be generated by the OS after completion of the log-in experience has been completed. This process remains extant until it detects a predetermined condition or event which returns the attributes of the instantiated browser back to its normal windowing display mode. Those of skill in the art will recognize that one way to provide this process is as a state machine, whereby the normal operation of displaying windowed screens is overridden until some event takes place that indicates that no further screens will be generated that will obscure the information screen, at least until the user takes further action. The state machine program then returns the attributes back to normal display mode subsequent to the occurrence and detection of the event.

In an embodiment of the invention, this batch file is set up at procedure 254 to run once and to run last with respect to all other functions executed during a particular phase of the initial log-in process 230. In one embodiment as applied to Windows® 2003, procedure 254 is accomplished by modifying the Windows® registry entry:

HKEY_LOCAL_MACHINE\Software\Windows\Current Version\RunOnceEx. This registry entry causes any program under any subkey listed thereunder to run once during log-in. Moreover, each program listed under a subkey is executed sequentially and in alphabetical order. Thus, the batch file may be placed under a subkey composed of many Z's to ensure that this subkey executes absolutely last for the phase of the log-in process in which the foregoing registry entry subkeys are executed. For example, the name of the subkey might be "ZZZZZZZZZ".

Additionally, because the batch file merely starts the two independent processes based on its execution, those two processes do not have to complete before processing of the subkey under which the batch file resides is complete. Thus, even though the processes remain extant beyond completion of this phase of the log-in experience, by merely launching the processes, the batch file itself completes execution as required by the subkey. In this way, this phase of the log-in process is not suspended indefinitely waiting for the processes to complete and the next phase (if any) of the log-in process may proceed normally. As previously mentioned, the batch file may be set up to run during more than one log-in if desirable. Those of skill in the art will recognize that there may be other registry entries under which the batch program might reside that could accomplish the same result, but the foregoing entry is a convenient one based on its functional characteristics. Moreover, there are other subkeys in the registry under which the batch file may be run for more than one log-in if that is desirable.

Those of skill in the art will also recognize that other OS programs may not contain this particular registry entry (for example other versions of Windows®), and may not even have a registry in the same sense that Windows® does (for example, Linux and Novell OS products). However, it should be understood that an embodiment of the invention could be adapted to these operating systems as well, provided that (1) the retrieved screen program(s) are set up to run once and last with respect to any particular phase of the log-in process that needs to complete before another such phase can begin or the process be completed; and (2) a program be provided as part of the retrieved screen program(s) that ensures that the displayed information screen remains visible to the user after completion of the initial log-in process and any OS procedures that follow, at least until the user has had a chance to act on the information displayed on the screen. Those of skill in the art will recognize that it may not be necessary to combine the programs used to accomplish these results into a batch file, if the execution of the two processes, which remain extant beyond completion of the log-in process, does not have to complete before the log-in process will continue to completion.

Figure 2D:
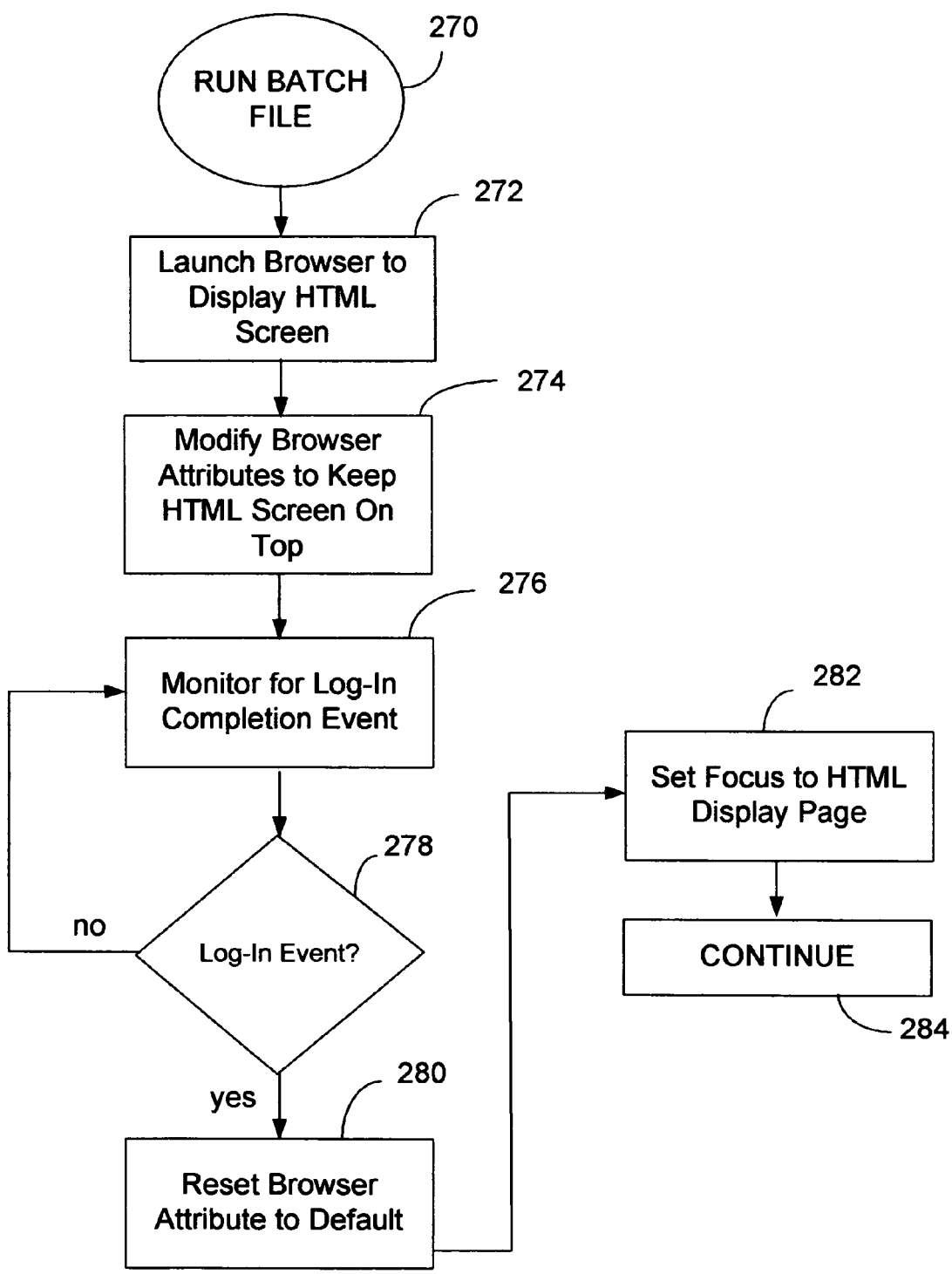
FIG. 2D is a procedural flow diagram illustrating execution of the batch file set up during the procedure of FIG. 2C in accordance with an embodiment of the invention.

Thus, only after all other log-in subkeys have been processed is the batch file executed at procedure 270 of FIG. 2D as part of the last subkey. The 'Display Screen' process of the batch file is launched at 272, followed by starting the Top.exe process (for maintaining the information screen on top until detection of a predetermined event) that includes procedures 274, 276, 278, 280, and 282. In one embodiment, the data files corresponding to the vendor provided information screen(s) that are retrieved from the system by the screen driver are in the form of HTML files. Thus, the Display Screen process instantiates a browser program such as Microsoft Internet Explorer® and then causes the browser to display the HTML screen. Those of skill in the art will recognize that other means for generating the display screen may be used, but that HTML makes convenient use of a readily available browser program.

The Top.exe process is then started at 274 where it modifies the attributes of the browser to ensure that the HTML screen is always displayed on top of any other screens that are generated subsequent to completion of the initial log-in process that would otherwise bury the vendor provided HTML screen. Once the offending screens have been generated and subordinated to the HTML screen, the "always-on-top" attribute of the vendor provided HTML display screen can be returned to the normal default paradigm where a user selection or subsequently generated screens may be given the focus to be displayed over the vendor provided HTML screen. This return to normal mode can be triggered based on the occurrence of some system event that indicates that no other screens will be subsequently generated that will obscure the vendor provided HTML screen until the user has had an opportunity to act on the HTML screen.

In one embodiment of the invention as applied to Windows® 2003, because the OS always launches a routine called "Manage Your Server" (MYS) after log-in is complete, without Top.exe the MYS screen would cover up the HTML information screen. Thus, the vendor provided HTML screen must be forced to remain on top by Top.exe until after the MYS screen had been generated. This can be accomplished by modifying an attribute of the browser to ignore the normal paradigm and to maintain itself always on top of the display notwithstanding the subsequent generation of the MYS screen. However, after the MYS screen has been generated, the OS may provide smaller bubble displays with information regarding some aspect of the system and instructions to modify it. It may be advantageous to permit these small popup balloons to rise to the top of the window hierarchy because they are important to configuration of the system and do not obscure any significant portion of the vendor provided HTML screen. For example, a bubble might pop up that indicates that resolution of the monitor might be increased and to click on the bubble to initiate a dialog box by which the resolution can be adjusted.

Thus, in one embodiment as applied to Windows® 2003, the Top.exe process acts as a state machine, first modifying a browser attribute (at 274, FIG. 2D) to put the browser into an "always-on-top" mode, maintaining this state until the occurrence of an event such as the generation of the MYS screen is detected (at 276, 278 of FIG. 2D). If detected, the process resets the attribute on the browser to normal mode (at 280, FIG. 2C) and ascribes the window focus to the HTML screen (at 282, FIG. 2D). Consequently, any bump of the mouse or a recovery from a screen saver keeps the vendor provided HTML screen on top, at least until the user selects a different window or closes the vendor provided HTML screen or the browser itself In the meantime, bubble pop-ups can now be displayed over the vendor provided HTML screen. In the run once mode, after the batch file has been executed, it is deleted from the registry, the screen driver is inactivated or deleted from the hard drive, and operation of the computer system 100, FIG. 1 returns to normal. Thereafter, log-in will proceed in accordance with the OS only.

Figure 3:
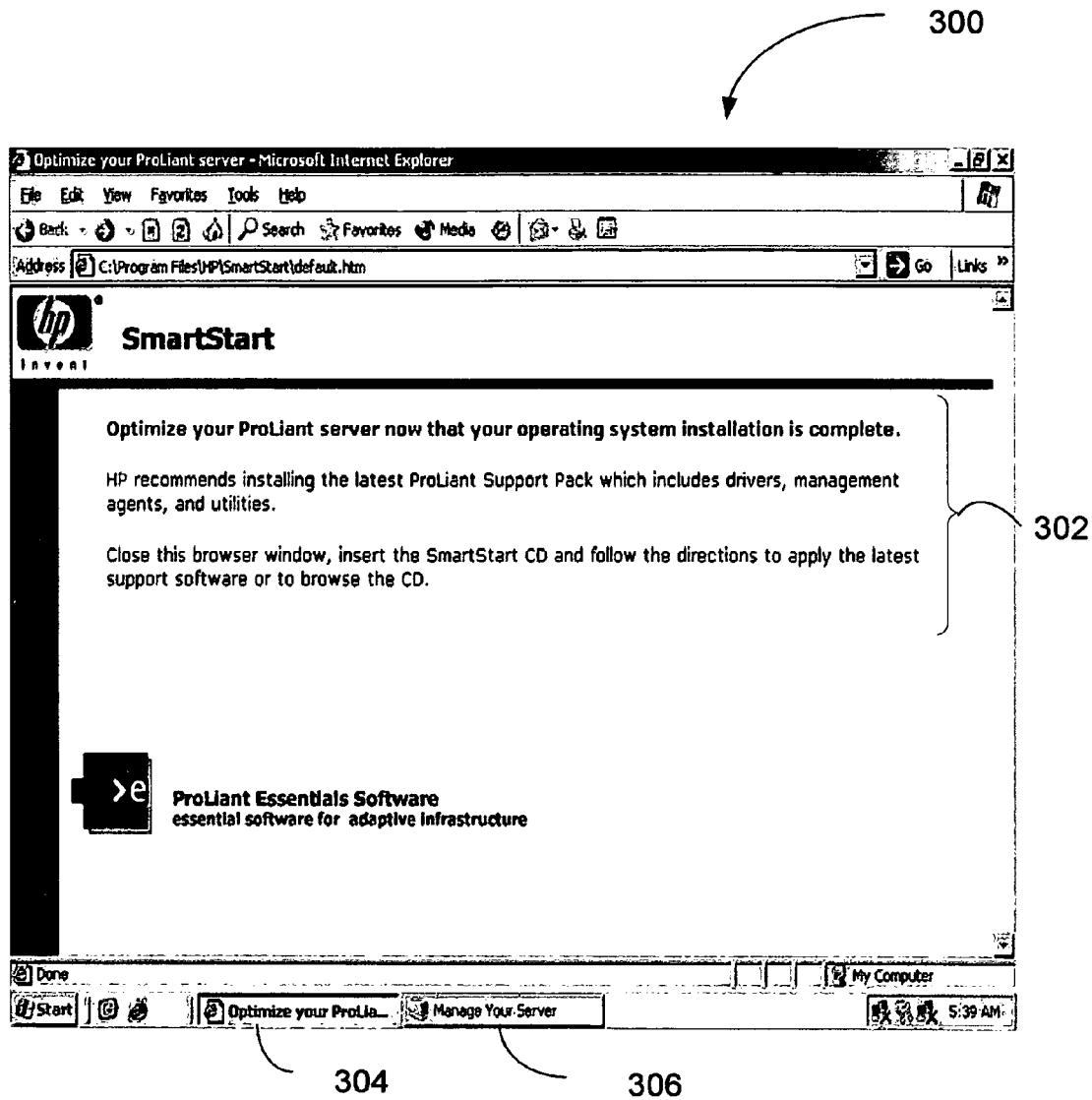
FIG. 3 is a screen shot of a display of the computer system of FIG. 1 generated by the procedures of FIGS. 2A through 2D in accordance with an embodiment of the invention.

FIG. 3 is a screen shot 300 of display 106 illustrating one possible vendor provided HTML screen in accordance with the providing information 302 alerting the user to the opportunity to optimize the server now that the OS has been installed. In this case the optimization may include additional drivers, a service pack and other value added software. It can be observed from the screen shot 300 that the Manage Your Server (MYS) screen 306 has been made subordinate to the vendor provided HTML screen 304, even though the MYS screen 306 was generated subsequent to the HTML screen 304. It should also be noted that vendor provided HTML screen could be the top page of a hierarchy of vendor provided HTML screens that could be linked together using hyperlinks. Thus, a user could click on desired links, and the browser could be made to display other vendor provided HTML screens in the hierarchy.

Program code is provided herein as Appendix A and is attached hereto. This program code is but one example of how the Top.exe process might be coded for an embodiment adapted to Windows® 2003. The copyright in such code is owned exclusively by Hewlett Packard Development Corporation and all rights therein are hereby reserved. Those of skill in the art will recognize that the Top.exe program can be coded in other ways without departing from the scope of the invention disclosed herein.

In summary, embodiments of the invention provide a method and apparatus by which a screen driver can be picked up along with other drivers provided with a computer system to the OS using known techniques. The screen driver waits until a user logs into the computer system for the first time after installation of the OS and retrieves display files and a program by which the files may be displayed and by which the visibility to the user of the displayed file may be maintained until the user can act on it subsequent to completion of the log-in process. This program may be set up to execute only once, at initial log-in, and only after all other OS log-in processes have been completed to avoid interfering with the log-in process. It may also be set up to run after future log-in experiences, and may display different vendor provided information screens than that provided during the initial log-in experience.

What is claimed is:

1. A method of displaying a vendor provided information screen in response to a log-in experience, said method comprising:
    initiating installation of an operating system (OS);
    providing a screen driver to the OS during the installation;
    completing installation of the OS;
    executing the screen driver upon initiation of the log-in experience, said executing the screen driver further comprising:
        displaying the information screen; and
        maintaining visibility of the information screen over subsequently generated display screens until occurrence of a predetermined event; and
    completing the log-in experience.

2. The method of claim 1 wherein said providing a screen driver further comprises storing the screen driver with other drivers to be retrieved by the OS during the installation of the OS.

3. The method of claim 2 wherein the screen driver is stored in and retrieved from a virtual installation disk (VID).

4. The method of claim 2 wherein the screen driver is stored on and retrieved from an external storage medium.

5. The method claim 2 wherein said executing the screen driver further comprises:
    retrieving one or more screen data files representative of the information screen; and
    retrieving a screen program, the screen program comprising a process for displaying the information screen based on the data files and a process for maintaining the information screen on top of any other subsequently generated display screens until the predetermined event is detected.

6. The method of claim 5 wherein said executing the screen driver further comprises setting up the retrieved screen program to run at the very end of a particular phase of the log-in experience.

7. The method of claim 5 wherein said executing the screen driver further comprises setting up the retrieved screen program to execute only once.

8. The method of claim 5 wherein said executing the screen driver further comprises setting up the retrieved program to execute only in response to a first log-in experience.

9. The method of claim 5 wherein said executing the screen driver further comprises setting up the retrieved program to execute in response to a plurality of log-in experiences.

10. The method of claim 5 wherein the process for displaying instantiates a browser program for displaying the information screen based on the screen data files comprise.

11. The method of claim 10 wherein the process for maintaining alters display window attributes of the browser.

12. The method of claim 10 wherein the information screen comprises hypertext links to one or more additional information screens define by the screen data files.

13. The method of claim 1 wherein the predetermined event is the generation of a particular display window by the OS after completion of the log-in experience.

14. The method of claim 5 wherein the OS is a version of Microsoft Windows having a registry; and wherein the method further comprises modifying the registry to execute the retrieved screen file.

15. The method of claim 14 wherein the retrieved screen program is a batch file comprising the process for displaying and the process for maintaining; and wherein the batch file is executed under an entry of the registry that runs its programs once.

16. The method of claim 14 wherein the retrieved screen program is a batch file comprising the process for displaying and the process for maintaining; and wherein the batch file is executed under an entry of the registry that runs its programs sequentially.

17. The method of claim 14 wherein the retrieved screen program is a batch file comprising the process for displaying and the process for maintaining; and wherein the batch file is executed under an entry of the registry identified as HKEY_LOCALMACHINE\Software\Windows\Current Version\RunOnceEX.

18. The method of claim 14 wherein:
the retrieved screen program is a batch file comprising the process for displaying and the process for maintaining;
the batch file is executed to initiate the process of displaying and the process of maintaining, the log-in experience is completed when execution of the batch file is completed; and
the process for displaying remains extant until closed by the user.

19. The method of claim 14 wherein:
the retrieved screen program is a batch file comprising the process for displaying and the process for maintaining;
the batch file is executed to initiate the process of displaying and the process of maintaining;
the log-in experience is completed when execution of the batch file is completed; and
the process for maintaining remains extant until occurrence of a predetermined event.

20. A computer program product for displaying a vendor provided information screen in response to a log-in experience, said computer program product comprising:
a computer-readable storage medium; and
program instructions stored on said storage medium for:
initiating installation of an operating system (OS);
providing a screen driver to the OS during the installation;
completing installation of the OS;
executing the screen driver upon initiation of the log-in experience, said executing the screen driver further comprising:
displaying the information screen; and
maintaining visibility of the information screen over any subsequently generated display screens until occurrence of a predetermined event; and
completing the log-in experience.

21. The computer program product of claim 20 wherein said program instructions further for retrieving the screen driver from a virtual installation disk (VID).

22. The computer program product of claim 21 wherein the program instructions further for:
retrieving one or more screen data files representative of the information screen; and
retrieving a screen program, the screen program comprising a process for displaying the information screen based on the data files and a process for maintaining the information screen on top of any other subsequently generated display screens until the predetermined event is detected.

23. The computer program product of claim 22 wherein the OS is a version of Microsoft Windows, said program instructions further for modifying the registry to execute the retrieved screen file.

24. The computer program product of claim 23 wherein the retrieved screen program is a batch file comprising the process for displaying and the process for maintaining, said program instructions further for executed under an entry of the registry identified as HKEY_LOCALMACHINE\Software\Windows\Current Version\RunOnceEX.

25. A computer system capable of displaying a vendor provided information screen in response to a log-in experience, said computer program product comprising:
a computer-readable storage medium; and
program instructions stored on said storage medium for:
initiating installation of an operating system (OS);
providing a screen driver to the OS during the installation;
completing installation of the OS;
executing the screen driver upon initiation of the log-in experience, said executing the screen driver further comprising:
displaying the information screen; and
maintaining visibility of the information screen over any subsequently generated display screens until occurrence of a predetermined event; and
completing the log-in experience.

26. The computer system of claim 25 wherein said program instructions further for retrieving the screen driver from a virtual installation disk (VID).

27. The computer system of claim 26 wherein the program instructions further for:
retrieving one or more screen data files representative of the information screen; and
retrieving a screen program, the screen program comprising a process for displaying the information screen based on the data files and a process for maintaining the information screen on top of any other subsequently generated display screens until the predetermined event is detected.

28. The computer system of claim 27 wherein the OS is a version of Microsoft Windows, said program instructions further for modifying the registry to execute the retrieved screen file.

29. The computer system of claim 28 wherein the retrieved screen program is a batch file comprising the process for displaying and the process for maintaining, said program instructions further for executed under an entry of the registry identified as HKEY_LOCALMACHINE\Software\Windows\Current Version\RunOnceEX.

* * * * *

UNITED STATES PATENT AND TRADEMARK OFFICE
CERTIFICATE OF CORRECTION

PATENT NO.       : 7,694,295 B2                                                       Page 1 of 1
APPLICATION NO.  : 10/766064
DATED            : April 6, 2010
INVENTOR(S)      : Rob Greenberg et al.

It is certified that error appears in the above-identified patent and that said Letters Patent is hereby corrected as shown below:

In column 10, line 39, in Claim 5, after "method" insert -- of --.

In column 11, line 3, in Claim 12, delete "define" and insert -- defined --, therefor.

In column 11, lines 30-33, in Caim 18, delete
"the batch file is executed to initiate the process of displaying
    and the process of maintaining, the log-in experience
    is completed when execution of the batch file is
    completed; and" and insert
--the batch file is executed to initiate the process of displaying
    and the process of maintaining;
the log-in experience is completed when execution of the batch
    file is completed; and --, therefor.

Signed and Sealed this

Sixth Day of July, 2010

David J. Kappos
*Director of the United States Patent and Trademark Office*